United States Patent [19]

Brandenburg et al.

[11] 3,912,659
[45] Oct. 14, 1975

[54] CATALYST FOR CONVERSION OF ALKYLAROMATICS

[75] Inventors: John T. Brandenburg, Hopewell Junction; Robert M. Suggitt, Wappingers Falls, both of N.Y.; Thomas M. Liden, Los Angeles, Calif.

[73] Assignee: Texaco Inc., New York, N.Y.

[22] Filed: May 15, 1973

[21] Appl. No.: 360,503

Related U.S. Application Data

[62] Division of Ser. No. 253,555, May 15, 1972, Pat. No. 3,792,098.

[52] U.S. Cl............................................. 252/455 Z
[51] Int. Cl.².......................................... B01J 29/06
[58] Field of Search ............... 252/455 Z; 260/672 T

[56] References Cited

UNITED STATES PATENTS

| | | |
|---|---|---|
| 3,476,821 | 11/1969 | Brandenburg et al........... 260/672 T |
| 3,546,102 | 12/1970 | Bertolacini...................... 252/455 Z |
| 3,574,092 | 4/1971 | Mitsche........................... 252/455 Z |
| 3,729,521 | 4/1973 | Gutberlet et al................ 260/672 T |

*Primary Examiner*—Carl F. Dees
*Attorney, Agent, or Firm*—Thomas H. Whaley; Carl G. Ries; George J. Darsa

[57] ABSTRACT

Alkylaromatic hydrocarbons are converted in the presence of a composite catalyst composed of a hydrogen mordenite, alumina and a sulfided Group VIII metal.

7 Claims, No Drawings

CATALYST FOR CONVERSION OF ALKYLAROMATICS

BACKGROUND OF THE INVENTION

This application is a division of application Ser. No. 253,555 filed May 15, 1972 now U.S. Pat. No. 3,792,098.

This invention relates to the catalytic conversion of alkylaromatic hydrocarbons. In a particularly desirable embodiment this invention is directed to the catalytic disproportionation of alkylaromatics such as toluene, xylene trimethylbenzenes, tetramethylbenzenes and pentamethylbenzenes. In addition, disproportionation can be accompanied by isomerization and transalkylation.

The catalytic conversion of alkylbenzenes has heretofore been considered employing a variety of catalysts. Catalysts proposed by the art include hydrogen mordenites containing a sulfided Group VIII metal and particularly decationized or hydrogen mordenites having high silica to alumina ratios as disclosed in U.S. Pat. No. 3,476,821, assigned to Texaco Inc. The process and catalytic compositions disclosed in this reference provides numerous advantages including the ability to selectively convert toluene to benzene and xylenes with virtually no naphthene formation. Further investigation has now shown that such processes and catalysts can be further upgraded by providing higher conversion of the alkylaromatic hydrocarbons and increased yields to desired products along with effectively improving the physical characteristics of the catalysts.

SUMMARY OF THE INVENTION

Broadly, this invention contemplates a process for the conversion of alkylaromatic hydrocarbons which comprises contacting said hydrocarbon with a sulfide compound and a composite catalyst comprising hydrogen mordenite having a silica to alumina mole ratio of greater than about 10 to 1, alumina, and a sulfided Group VIII metal. In another embodiment of this invention the catalyst is prepared by impregnating a hydrogen mordenite having a silica to alumina mole ratio of greater than about 10 to 1 with a Group VIII metal, admixing the impregnated mordenite with hydrated alumina, calcining the mixture at temperatures up to 1100°F. and sulfiding the Group VIII metal. It has been found that the conversion of alkylaromatics in the presence of the aforementioned catalyst is significantly improved and that the catalyst composition employed in the process possesses superior mechanical strength contributing to long catalyst life under the processing conditions.

The contemplated alkylaromatic conversion process described in greater below involves disproportionation of the named hydrocarbons. As additional embodiments of the process, disproportionation can also be accompanied by isomerization and/or transalkylation of the hydrocarbon feedstock.

The hydrocarbons converted by the instant process include alkylaromatics by which we mean alkylbenzenes possessing from one to five methyl groups. Particularly preferred alkylbenzenes are those containing from 1 to 4 methyl groups where the feedstock can be any one of the methylated aromatic hydrocarbons or mixtures thereof. Specific examples include toluene, ortho-, meta- and paraxylene, trimethylbenzenes such as mesitylene, pseudocumene and hemimellitene, tetramethylbenzenes including durene, isodurene and prehnitene, and pentamethylbenzene along with mixtures of the above.

With regard to the conversion of the hydrocarbon by means of disproportionation, the feedstock containing one or more alkylaromatic hydrocarbons is contacted with the aforementoned catalyst at a temperature effective to convert at least some of the alkylaromatic hydrocarbons to aromatic products having a greater number and a lesser number of carbon atoms.

In addition to disproportionation, hydrocarbons isomerized by the instant process include those alkylbenzenes possessing from two to four methyl groups including ortho-, meta- and paraxylene, trimethylbenzenes such as mesitylene, pseudocumene and hemimellitene and tetramethylbenzenes such as durene, isodurene and prehnitene along with mixtures of the above.

Likewise, disproportionation can be associated with transalkylation when the feedstock comprises a mixture of at least two alkylbenzenes having from one to five methyl groups and where at least two alkylbenzenes in the mixture have a different number of methyl groups. Illustratively, toluene and pentamethylbenzene can be transalkylated to xylenes, trimethylbenzenes and tetramethylbenzenes.

Similarly, disproportionation, isomerization and transalkylation can be simultaneously undertaken when the feedstock comprises a mixture of at least two alkylbenzenes having from two to four methyl groups and where at least two alkylbenzenes in the mixture have a different number of methyl groups. For example, such a conversion can be conducted employing a mixture of xylene, such as orthoxylene, and 1,2,4,5-tetramethylbenzene.

In accordance with our invention, the composite catalyst employed to convert the aforementioned hydrocarbons is prepared by initially providing a hydrogen mordenite having a silica to alumina mole ratio above about 10:1 but less than about 100:1, particularly between about 12:1 and 80:1. In a highly preferred embodiment the hydrogen mordenite possesses a silica to alumina mole ratio of about 25:1 to 50:1. Hydrogen mordenites contemplated above as a component of the composite catalyst can be prepared from natural or commercially available synthetic sodium mordenites or commercially available hydrogen mordenites having silica to alumina ratios of about 10:1.

The sodium form of mordenite is not effective as a component of the catalyst employed herein. However, it may be converted to hydrogen mordenite by ion exchange of the sodium in the modenite with ammonium ions followed by heating or calcining to drive off ammonia. Alternatively, decationized or hydrogen mordenite can be provided by acid treatment of the sodium form. The hydrogen mordenite (10:1 $SiO_2/Al_2O_3$) whether prepared as above or available from commercial sources is thereafter subjected to severe acid leaching so as to substantially increase the silica to alumina mole ratio of the hydrogen mordenite to above about 10:1. However, the acid leaching operation must not destroy the mordenite's crystalline structure. Moreover, little improvement is realized in our process where the silica to alumina ratio of the mordenite is greater than about 100:1. Consequently, as a practical limit the acid leaching should be severe enough to produce a mordenite having a silica to alumina ratio between about 12:1 and 80:1, preferably from about 25:1 to 50:1. To acid leach the hydrogen mordenite we employ a mineral acid, for example hydrochloric or sulfuric acid, so as to selectively remove aluminum without destroying the crystalline structure of the mordenite. Acid strengths of 1 to 8N are appropriate and the leaching temperatures can range from room temperature up to the boiling point of the acid solution. Acid leaching is best accomplished when the mordenite is in the powdered form and not when pelleted. Following the leaching operation, the mordenite is water washed free of acid anions and is in the form of small soft aggregates of a particle size generally in the range of about 0.5 to 10 microns.

The acid leached hydrogen mordenite is now in a suitable form for impregnation with an aqueous solution of a Group VIII metal salt. Group VIB metals may also be associated with the mordenite and the Group VIII impregnating solution may additionally contain soluble salts of members of Group VIB or separate and subsequent impregnation may be undertaken with the Group VIB component. Group VIII metals including platinum, palladium, rhodium, ruthenium, nickel and cobalt are introduced in an amount sufficient to provide the final composite catalyst with a Group VIII metal content of from 0.2 to 10.0 weight percent. Preferably, we employ nickel or cobalt in an amount of from 3.0 to 8.0 weight percent. Platinum, palladium, rhodium and ruthenium are preferably present in an amount of about 0.2 to 2.0 weight percent. The Group VIB metal including tungsten, molybdenum and chromium can also be associated with the hydrogen mordenite in amount ranging from about 3.0 to 15.0 weight percent based on the composite catalyst. After employing impregnation techniques well known to the art, the impregnated high silica hydrogen mordenite is beneficially heated to a temperature of from 100° to 300°F. so as to partially dry the impregnated particulates.

The improvements in alkylaromatic conversion are achieved by admixing the metal impregnated high silica hydrogen mordenite with hydrated alumina such that the ultimate composite catalyst contains alumina as a component thereof in amounts ranging from 10 to 50 weight percent and preferably from 15 to 30 weight percent. In practice, the metal impregnated mordenite is introduced into a freshly prepared precipitate of hydrated alumina, such as alpha or beta alumina hydrate, and the components are mulled by passing through a Colloid Mill to give a uniform dispersion of the mordenite in the alumina. The mixing in the Colloid Mill causes the impregnated mordenite aggregates, some of which may be of a size of 20 to 50 microns, to be broken down into particles having average diameters of about 0.5 to 5 microns. We have found that by impregnating the hydrogen mordenite powder we secure a more uniform distribution of the metal component than can be obtained by impregnation of a formed pellet. The composite resulting from the admixing operation is dried at temperatures of for example 130° to 150° F., although higher or lower temperatures may also be employed. The composite is subsequently crushed and sieved, for example through a −40 mesh. Sufficient water is added to give a good extrusion mix and the composite is formed into the desired shape contemplated for ultimate use. Illustratively, the particles can be ground to provide a finely divided catalytic mass as by mulling or beads may be formed but we prefer that the composite be extruded.

Subsequent to shaping, the composite is dried and calcined at a temperature up to 1100°F. Drying of the composite may be undertaken at ambient temperature or at temperatures of about 300°F. for several hours. Alternatively, ambient temperature can be initially employed with subsequent incremental increases in temperature to about 300°F. Thereafter the composite is calcined at temperatures of from about 500° to 1100°F., preferably in a stream of dry gas, and preferably at maximum temperatures of from 850° to 1000°F. Calcining of the composite converts the hydrated alumina to gamma or eta alumina depending upon whether the initial hydrate was alpha or beta. At the completion of the calcination step, the converted alumina is transformed into a strong binder. Pellets prepared by this technique possess crush strengths of from 10 to 40 pounds whereas catalysts excluding alumina are weak and have crush strengths of only a few pounds.

The Group VIII metal component of the calcined composite is thereafter converted to the sulfide and maintained in that condition during use. The metal component may be sulfided by contacting with for example hydrogen sulfide at a temperature of from 400° to 800°F. contained in a carrier gas such as hydrogen. In another technique the catalyst can be heated to operating temperature and then contacted with the liquid feed enriched with a sulfur containing compound such as for example carbon disulfide or methyl disulfide.

Inasmuch as the sulfided catalyst metal may be reduced during use, particularly when alkylaromatic conversion is conducted in the presence of hydrogen, the introduction of minor amounts of sulfur compounds into the reaction vessel will maintain the catalyst in a sulfided condition. This may be done by adding hydrogen sulfide to the hydrogen stream entering the reactor or by incorporating compounds such as carbon disulfide or methyl disulfide which decompose readily to hydrogen sulfide in the presence of hydrogen under the reactor conditions. These additions should be sufficient to maintain a mole ratio of hydrogen sulfide to hydrogen in the gas phase of from $3 \times 10^{-4}$ to $1 \times 10^{-2}$ over the catalyst. Typically, mole ratios of from $7 \times 10^{-4}$ to $5 \times 10^{-3}$ of hydrogen sulfide to hydrogen are used with the higher ratios of $H_2S:H_2$ generally being used at higher reaction temperatures. We have found that this low concentration of sulfide achieves the desired result without reacting to contaminate the products of conversion.

Although hydrogen has often been employed in prior art catalytic conversion processes, its use in our processes is not critical. The use of hydrogen is recommended though since it will prolong the useful life of the catalyst. In general preferred operating conditions for alkylaromatic conversion as practiced by our invention in the presence of the aforementioned catalyst includes space velocities in the range of about 0.1 to 15 liquid volumes per hour per volume of catalyst, preferably 0.5 to 8 LHSV; temperatures in the range of about 400° to 750°F., preferably 450° to 650°F; pressures within the range of 100 to 2000 p.s.i.g., preferably in the range of 800 to 1200 p.s.i.g. and when hydrogen is used hydrogen concentrations of 100 to 15,000 s.c.f/bbl. of feed, preferably 5000 to 10,000 s.c.f./bbl. The reaction is suitably carried out over a fixed bed of catalyst with feedstock passing downwardly through the catalyst bed.

As the catalyst ages its activity slowly diminishes. The catalyst may be maintained at or periodically brought back to approximately its initial level of activity by increasing the operating temperature. Ultimately, regeneration of the catalyst by oxidation can be employed involving a controlled burning of the contaminants from the surface of the catalyst structure with air or a mixture of inert gases with air or oxygen.

The beneficial effects derived from the aforementioned invention are twofold. First the composite catalyst possesses significantly greater mechanical strength as compared to dealuminized mordenites containing a sulfided Group VIII metal thereon. The improved mechanical strength is attributed to the presence in the composite of eta or gamma alumina. Secondly, and totally unexpected, is the greater activity possessed by the composite catalyst containing the alumina. Such a result was unexpected inasmuch as alumina is virtually an inert material for disproportionating alkylbenenes. Contrary to what would have been expected, namely that the catalytic activity of the Group VIII sulfided dealuminized mordenite would be diminished by dilution with alumina, we have found that higher conversion results in the presence of the composite catalyst in terms of alkylbenzene converted.

Operating in accordance with the conditions and catalyst described above, it has been found that the methylated aromatic feedstock is selectively converted such that the fractions obtained are substantially free of ethylated aromatics, $C_6$ and $C_7$ naphthenes and light hydrocracked products boiling below 150°F. For example, toluene disproportionation to benzene and isomeric xylenes yields a product substantially free of ethylbenzene and as such provides an attractive route for the preparation and recovery of paraxylene from $C_8$ aromatic fractions. Likewise, disproportionation of orthoxylene results in a product low in alkylated aromatic isomer content such that the concentration of trimethylbenzenes is proportionately high and recovery of mesitylene, in particular, by distillation is facilitated by the relative absence of ethyltoluenes such as orthoethyltoluene. Other advantages include the absence of ethylbenzene in the xylene fraction enabling recovery of paraxylene by low temperature crystallization more efficiently. During the disproportionation of xylene or heavier methylated benzenes, we obtained isomerization of the $C_8$, $C_9$ and $C_{10}$ methylbenzenes to approximately their thermodynamic equilibrium distribution.

On disproportionating and isomerizing orthoxylene, pseudocumene and other polymethylbenzenes, the relative amounts of the dimethyl-, trimethyl- and tetramethylbenzene isomers are approximately in accordance with the amounts anticipated basis thermodynamic considerations. For example, the relative amounts of dimethylbenzenes, trimethylbenzenes and tetramethylbenzenes to be found in the $C_8$, $C_9$ and $C_{10}$ fractions respectively, basis thermodynamic equilibrium considerations, are as follows at 441° and 621°F.

| Temperature, °F. | 441 | 621 |
|---|---|---|
| Mole Percent in $C_8$ fraction | | |
| 1,2-dimethylbenzene | 20.6 | 21.9 |
| 1,3-dimethylbenzene | 55.2 | 54.1 |
| 1,4-dimethylbenzene | 24.2 | 24.0 |
| Mole Percent in $C_9$ fraction | | |
| 1,2,3-trimethylbenzene | 6.0 | 7.7 |
| 1,2,4-trimethylbenzene | 67.1 | 67.8 |
| 1,3,5-trimethylbenzene | 26.9 | 24.5 |
| Mole Percent in $C_{10}$ fraction | | |
| 1,2,3,4-tetramethylbenzene | 13.1 | 15.2 |
| 1,2,3,5-tetramethylbenzene | 51.3 | 50.5 |
| 1,2,4,5-tetramethylbenzene | 35.6 | 34.3 |

As will be seen in the examples, the relative amounts of the dimethylbenzenes and trimethylbenzenes on isomerizing and disproportionating xylene are in good agreement with these thermodynamic values. In disproportionating pseudocumene (1,2,4-trimethylbenzene), the amount of prehnitene (1,2,3,4-tetramethylbenzene) relative to the other tetramethylbenzenes is slightly less and the amount of durene (1,2,4,5-tetramethylbenzene) is slightly greater than the predicted amounts basis chemical equilibrium considerations. The formation of a greater amount of durene relative to prehnitene than what may be expected from thermodynamic considerations is a desirable result as durene is a more valuable material and its recovery is favored by higher contents in the $C_{10}$ fraction.

The disproportionated and isomerized aromatic hydrocarbons provided by our process have utility as solvents or as raw materials for the manufacture of numerous industrial chemicals and products. For example orthoxylene finds application as a raw material in the production of phthalic anhydride and phthalate plasticizers while metaxylene is important to the production of isophthalic acid. Paraxylene is used in the production of terephthalic acid or terephthalate esters which find particular utility in the manufacture of polyester fiber. Benzene produced from our process is useful as a solvent and as a raw material for the synthesis of styrene, phenol, nitrobenzene and cyclohexane which in turn can be used to produce such materials as synthetic rubber, detergents, and insecticides. Other aromatics such as the trimethylbenzenes pseudocumene and mesitylene are employed respectively to prepare trimellitic anhydride useful in preparing non-volatile plasticizers and trimesic acid to make cross-linked polymers. Tetramethylbenzenes such as durene are employed in making pyromellitic dianhydride used in the preparation of higher temperature resistant polymers.

In order to more fully illustrate the nature of our invention and manner of practicing the same the following examples are presented.

EXAMPLE I 2000 grams of a commercially available sodium mordenite powder having an average particle size of about 10 to 30 microns and comprising 6.86 weight percent $Na_2O$, 10.2 weight percent $Al_2O_3$, 68.2 weight percent $SiO_2$ and a $SiO_2/Al_2O_3$ mole ratio of 11.4/1 was acid leached with 4 liters of 6N HCl for 24 hours at a temperature of 130° to 140°F. The acid was decanted and the solids washed 3 times with 4 liters of hot water and 3 times with 4 liters of cold water which provided a product comprising 0.95 weight percent $Na_2O$, 6.9 weight percent $Al_2O_3$, 86.1 weight percent $SiO_2$ and a $SiO_2/Al_2O_3$ mole ratio of 21.2/1. The acid leaching was again repeated, the product was washed free of chloride ion, dried at 300°F. and calcined to a temperature of 1000°F. in a stream of dry air. The final acid leached mordenite consisted of 0.09 weight percent $Na_2O$, 3.74 weight percent $Al_2O_3$, 88.2 weight percent $SiO_2$ and a $SiO_2/Al_2O_3$ mole ratio of 40/1.

410 grams of the acid leached mordenite was impregnated with 250 cc. of a cobalt nitrate solution containing 125 grams of Co $(NO_3)_2·6H_2O$ and the impregnated powder was dried for 16 hours at a temperature of 130° to 140°F.

368 grams of $Al_2(SO_4)_3·18H_2O$ were dissolved in 3 liters of distilled water and 300 cc of concentrated ammonium hydroxide were added to effect precipitation of aluminum hydroxide. The precipitate was recovered by filtration and washed 3 times with distilled water. The cobalt impregnated acid leached mordenite was mixed with the wet hydrated alumina precipitate and passed through a mill to effect homogeneous mixing. After partially drying the mixture at a temperature of 130° to 140°F. for 16 hours and extruding into 1/16 inch pellets, the pellets were dried at room temperature for 16 hours, at 130° to 140°F. for 8 hours, at 300°F. for 16 hours and finally calcined at 1000°F. for 2 hours in dry air. The calcined catalyst pellets were sulfided at 700°F. for 4 hours with hydrogen sulfide. The recovered sulfided catalyst consisted of 4.4 weight percent cobalt, 15 weight percent gamma alumina and the remainder hydrogen mordenite having a $SiO_2/Al_2O_3$ mole ratio of 40/1. The composite catalyst had an average crush strength of 20 pounds as determined by using a Chatillon Crush Strength Tester. A series of runs were conducted using a toluene feedstock consisting of 99.8 percent toluene plus 0.2 percent carbon disulfide which was introduced to disproportionation reactors containing 100 cc of the catalyst prepared above under the processing conditions summarized in Table I.

TABLE I

| Run | 1 | 2 | 3 |
|---|---|---|---|
| temperature, °F. | 550 | 515 | 575 |
| LHSV | 2.0 | 5.3 | 4.9 |
| Pressure, p.s.i.g. | 800 | 800 | 800 |
| $H_2$/hydrocarbon mole ratio | 5 | 5 | 5 |
| % Sulfur in Feed | 0.2 | 0.2 | 0.2 |
| Product Analysis, wt. % | | | |
| Cracked Below $C_6$ | 0.06 | — | — |
| $C_6$, $C_7$, $C_8$ naphthenes | 0.19 | 0.05 | 0.08 |
| Benzene | 22.65 | 9.77 | 17.77 |
| Toluene | 49.13 | 78.23 | 59.82 |
| Ethylbenzene | 0.09 | } 8.66 | } 15.27 |
| Paraxylene | 5.87 | | |
| Metaxylene | 12.96 | | |
| Orthoxylene | 4.89 | 2.26 | 4.13 |
| Paraethyltoluene | 0.08 | } 0.07 | } 0.22 |
| Meta + orthoethyltoluene | 0.20 | | |
| Mesitylene | 1.10 | 0.26 | 0.72 |
| Pseudocumene | 2.33 | 0.62 | 1.62 |
| Hemimellitene | 0.30 | 0.07 | 0.21 |
| Ethylxylenes | 0.04 | — | 0.03 |
| Durene | 0.05 | } 0.01 | 0.05 |
| Isodurene | 0.05 | | 0.04 |
| Prehnitene | 0.02 | — | 0.02 |
| Heavier than $C_{10}$ | 0.01 | — | 0.02 |

In the temperature range of 500° to 600°F. the maximum theoretical conversion of toluene via disproportionation is about 58 percent. It is seen from Table I that an approach of about 87 percent to chemical equilibrium is obtained at 550°F. and 2 LHSV while at the same time retaining a high selectivity for benzene and polymethylbenzene formation. For example, the $C_8$ aromatic fraction is nearly all dimethylbenzenes (xylenes) with less than 0.4 percent ethylbenzene. This $C_8$ fraction is then an excellent stock for xylene separation as there is no need to fractionate out ethylbenzene before paraxylene recovery can be initiated. The concentration of the xylenes in the $C_8$ aromatic fraction are at thermodynamic equilibrium in regard to each other and the same is true of the trimethylbenzenes in the $C_9$ fraction.

Significant conversions are also obtained at still higher flow rates of toluene over the catalyst and at temperatures of 515° and 575°F.

EXAMPLE II 2000 grams of commerically available sodium mordenite powder comprising 6.86 weight percent $Na_2O$, 10.2 weight percent $Al_2O_3$, 68.2 weight percent $SiO_2$ and a $SiO_2/Al_2O_3$ mole ratio of 11.4/1 was acid leached with 4 liters of 6N HCl for 24 hours at a temperature of 130° to 140°F. The acid was decanted and the solids washed 3 times with 4 liters of hot water and 3 times with 4 liters of cold water. The acid leaching was repeated 3 more times and the product was washed free of chloride ion, dried at 300°F. and calcined at a temperature of 1000°F. in dry air. The final acid leached mordenite consisted of 0.02 weight percent $Na_2O$, 2.54 weight percent $Al_2O_3$, 90.6 weight percent $SiO_2$ and had a $SiO_2/Al_2O_3$ mole ratio of 60/1. 400 grams of the above described acid leached mordenite was impregnated with 200 cc. of a nickel nitrate solution containing 107 grams of $Ni(NO_3)_2·6H_2O$ and the impregnated powder was dried for 16 hours at a temperature of 130° to 140°F.

817 grams of $Al_2(SO_4)_3·18H_2O$ were dissolved in 3 liters of distilled water and 400 cc. of concentrated ammonium hydroxide were added to effect precipitation of the alumina hydroxide. The precipitate was recovered by filtration and washed three times with distilled water. Half of the resulting alumina gel was used in further preparing the catalyst.

720 grams of the nickel impregnated acid leached mordenite were mixed with 1455 grams of wet hydrated alumina gel and passed through a mill to effect homogeneous mixing. After partially drying the mixture at 130° and 140°F. for 16 hours, the mixture was ground and sieved to −40 mesh. Sufficient water was added to ensure a good extrusion mix and the material was then extruded into 1/16 inch pellets. The pellets were dried at ambient temperature for 16 hours, at 130° to 140°F. for 8 hours and at 300°F. for 16 hours. Thereafter, the pellets were calcined in dry air starting at 500°F. and the temperature raised in increments of 100°F. per hour until a final temperature of 1000°F. was reached whereupon the catalyst was calcined at 1000°F. for 2 hours in dry air.

The calcined catalyst was sulfided at 700°F. for 4 hours with $H_2S$ and subsequently cooled in a stream of dry nitrogen. The sulfided catalyst consisted of 4.6 weight percent nickel, 5.5 weight percent sulfur, 15 weight percent gamma alumina and the remainder hydrogen mordenite having a $SiO_2/Al_2O_3$ mole ratio of 60/1. The material had an average crush strength of 14 pounds as determined employing a Chatillon Crush Strength Tester.

EXAMPLE III 460 grams of commerically available hydrogen mordenite powder comprising 8.9 weight percent $Al_2O_3$, 81.1 weight percent $SiO_2$ and a $SiO_2/Al_2O_3$ mole ratio of 16/1 was impregnated with 250 cc. of a solution containing 125 grams of $Co(NO_3)_2 \cdot 6H_2O$. The material was dried at 130° to 140°F. for 16 hours.

368 grams of $Al_2(SO_4)_3 \cdot 18H_2O$) were dissolved in 3 liters of distilled water and 300 cc of concentrated ammonium hydroxide were added to effect precipitation of aluminium hydroxide. The precipitate was recovered by filtration and washed 3 times with distilled water.

The cobalt impregnated hydrogen mordenite, 669 grams, was mixed with 971 grams of the wet hydrated alumina gel and passed through a Colloid Mill to effect homogeneous mixing. After partially drying the mixture at 130° to 140°F. for 16 hours, the mixture was ground and sieved to −40 mesh. Sufficient water was added to ensure a good extrusion mix and the material was then extruded into 1/16 inch pellets. The pellets were dried and calcined in the same manner as in Example II. The catalyst consisted of 4.7 weight percent cobalt, 15 weight percent gamma alumina, the remainder hydrogen mordenite having a $SiO_2/Al_2O_3$ mole ratio of 16/1 and had an average crush strength of 40 pounds. The catalyst was sulfided in the manner described in Example II and had the following calculated composition: 5.0 weight percent cobalt, 2.7 weight percent sulfur, 15.0 weight percent gamma alumina the remainder hydrogen mordenite, and had a crush strength similar to the unsulfided material.

EXAMPLE IV 2000 grams of commerically available sodium mordenite 1/16 inch pellets comprising 7.2 weight percent $Na_2O$, 12.5 weight percent $Al_2O_3$, 75.0 weight percent $SiO_2$ and a $SiO_2/Al_2O_3$ mole ratio of 10/1 was acid leached with 4 liters of 6N HCl for 24 hours at a temperature of 130° to 140°F. The acid was decanted and the solids washed three times with 6 liters of hot water and 3 times with 6 liters of cold water. The acid leaching was repeated three more times and the product was washed free of chloride ion, dried at 300°F. and calcined at a temperature of 1000°F. in dry air. The final acid leached mordenite consisted of 0.07 weight percent $Na_2O$, 2.3 weight percent $Al_2O_3$, 88.3 weight percent $SiO_2$ and had a $SiO_2/Al_2O_3$ mole ratio of 65/1. 423 grams of the acid leached mordenite pellets were thereafter impregnated with 200 cc of a cobalt nitrate solution containing 105 grams of $Co(NO_3)_2 \cdot 6H_2O$. After drying on steam plate for 2 hours and at 300°F. for 16 hours, the pellets were calcined in dry air starting at 500°F. for 1 hour and the temperature raised in increments of 100°F. per hour until a final temperature of 1000°F. was reached whereupon the pellets were calcined at 1000°F. for 2 hours in dry air.

The calcined pellets were sulfided at 700°F. for 4 hours with $H_2S$ and the final catalyst consisted of 5.5 weight percent cobalt, 3.4 weight percent sulfur and the remainder hydrogen mordenite having a $SiO_2/Al_2O_3$ mole ratio of 65/1. The catalyst had an average crush strength of 4.0 pounds.

EXAMPLE V 340 grams of alumina 1/16 inch pellets were impregnated with 200 cc of a cobalt nitrate solution containing 90 grams of $Co(NO_3)_2 \cdot 6H_2O$. The pellets were dried, calcined and sulfided as in Example IV. The final material had a calculated composition of 4.7 weight percent cobalt, 2.5 weight percent sulfur, and the remainder alumina and had an average crush strength of 12.7 pounds.

EXAMPLE VI 4000 grams of commerically available sodium mordenite powder comprising 6.86 weight percent $Na_2O$, 10.2 weight percent $Al_2O_3$, 68.2 weight percent $SiO_2$ and a $SiO_2/Al_2O_3$ mole ratio of 11.4/1 was acid leached with 8 liters of 6N HCl for 24 hours at a temperature of 130° to 140°F. The acid was decanted and the solids washed 3 times with 4 liters of hot water and 3 times with 4 liters of cold water. The acid leaching was repeated a second time and the product was washed free of chloride ion, dried at 300°F. and calcined in dry air at a temperature of 1000°F. The final acid leached mordenite consisted of 0.31 weight percent $Na_2O$, 4.53 weight percent $Al_2O_3$, 90.9 weight percent $SiO_2$ and had a $SiO_2/Al_2O_3$ mole ratio of 34/1.

1323 grams of the above described acid leached mordenite were impregnated with 600 cc of a cobalt nitrate solution containing 375 grams of $Co(NO_3)_2 \cdot 6H_2O$ and the impregnated powder was dried for 16 hours at a temperature of 130° to 140°F.

1470 grams of $Al_2(SO_4)_3 \cdot 18H_2O$ were dissolved in twelve liters of distilled water and 1000 cc of concentrated ammonium hydroxide were added to effect precipitation of the alumina hydroxide. The precipitate was recovered by filtration and washed 3 times with distilled water.

The cobalt impregnated acid leached mordenite was mixed with the wet hydrated alumina gel and passed through a Colloid Mill to effect homogeneous mixing. After partially drying the mixture at 130° to 140°F. for 16 hours, the mixture was ground and sieved to −40 mesh. Sufficient water was added to ensure a good extrusion mix and the material was then extruded into 1/16 inch pellets. The pellets were dried at ambient temperature for 16 hours, at 130° to 140°F. for 8 hours and at 300°F. for 16 hours. Thereafter the pellets were calcined in dry air starting at 500°F. and the temperature raised in increments of 100°F. per hour until a final temperature of 1000°F. was reached whereupon the catalyst was calcined at 1000°F. for 2 hours.

The calcined catalyst was sulfided at 700°F. for 4 hours with hydrogen sulfide and subsequently cooled in a stream of dry nitrogen. The sulfided catalyst consisted of 3.5 weight percent cobalt, 7.5 weight percent sulfur, 15.0 weight percent alumina and the remainder hydrogen mordenite having a $SiO_2/Al_2O_3$ mole ratio of 34/1. The material had an average crush strength of 18 pounds as determined employing a Chatillon Crush Strength Tester.

EXAMPLE VII

The catalysts prepared in Examples IV to VI were evaluated to determine their ability to disproportionate alkylaromatic hydrocarbons. In this example, toluene was selected as the feedstock and the results are set out in Table II below. The feedstock employed in the runs reported in Table II consisted of 99.8 percent toluene along with 0.2 percent carbon disulfide introduced to disproportionation reactors containing 100 cc of the respective catalysts.

TABLE II

| CATALYST, Example | IV | V | VI |
|---|---|---|---|
| Temperature, °F. | 553 | 557 | 553 |
| LHSV | 2.9 | 3.3 | 3.0 |

TABLE II-Continued

| CATALYST, Example | IV | V | VI |
|---|---|---|---|
| Pressure, p.s.i.g. | 800 | 800 | 800 |
| H₂/hydrocarbon mole ratio | 5.2 | 4.7 | 5.3 |
| Product Analysis, wt. % | | | |
| Non-aromatics | 0.2 | 0.1 | 0.2 |
| Benzene | 10.0 | 0.1 | 18.7 |
| Toluene | 77.0 | 99.8 | 56.6 |
| C₈ aromatics | 11.8 | — | 21.5 |
| C₉ aromatics | 0.9 | — | 3.9 |

From Table II it will be seen that catalyst V composed of cobalt sulfide on alumina resulted in essentially no conversion of toluene and was deemed inactive. The introduction of alumina as component of a Group VII metal on acid leached mordenite (Catalyst VI) was far superior to a catalyst composed of the Group VIII metal and acid leached mordenite (Catalyst IV). The conversion of toluene when Catalyst VI was employed (43.4%) was almost twice as great as when Catalyst IV was used (23%) under esentially the same conditions of temperature, pressure, space velocity and hydrogen to hydrocarbon mole ratio, Another material, not shown in Table II composed of 15 weight percent alumina with the remainder being hydrogen mordenite having a SiO₂/Al₂O₃ mole ratio of 40/1 gave low toluene conversion (about 15%) at 542°F. Carbon laydown on this material resulted in rapid deactivation.

When a transition hydrogenation type metal is not present on the catalyst, the catalyst deactivates rapidly due to coke lay down. The addition of from 0.5 to 10 percent nickel or cobalt, preferably 3 to 8 percent, or from 0.2 to 2.0 weight percent platinum, palladium, rhodium or ruthenium reduces the deactivation rate of the catalyst. Catalysts containing approximately 5 weight percent cobalt present in the sulfided state have operated for over 300 hours with only a slight loss in conversion rate whereas the same catalyst with no metal present in virtually inactive within 24 hours due to carbon laydown.

EXAMPLE VIII

A catalyst composed of 5 weight percent cobalt, 5.5 weight percent sulfur, 15 weight percent alumina and the remainder hydrogen mordenite having a mole ratio of 40/1 in the form of ⅛ inch pellets was employed to convert orthoxylene and pseudocumene, each feedstock containing 0.2 percent sulfur present as methyl disulfide. Table III summarizes the results.

TABLE III

| Feed | Orthoxylene | Pseudocumene |
|---|---|---|
| Temperature, °F. | 504 | 506 |
| Pressure, p.s.i.g. | 800 | 800 |
| LHSV | 2 | 1.5 |
| H₂/hydrocarbon mole ratio | 5.8 | 8.2 |
| Product Analysis | | |
| Cracked (light paraffins) | 0.14 | 0.27 |
| Naphthenes | 0.10 | 0.24 |
| Benzene | 1.80 | 0.12 |
| Toluene | 17.40 | 2.17 |
| Ethylbenzene | 0.01 | — |
| p-xylene | 12.84 | 4.03 |
| m-xylene | 31.65 | 10.10 |
| o-xylene | 14.11 | 3.40 |
| p-Ethyltoluene | 0.01 | 0.02 |
| m-Ethyltoluene | 0.05 | 0.06 |
| o-Ethyltoluene | <0.01 | <0.01 |
| 1,3,5-Trimethylbenzene | 4.86 | 15.22 |
| 1,2,4-Trimethylbenzene | 13.60 | 36.89 |
| 1,2,3-Trimethylbenzene | 1.51 | 4.42 |
| Ethylxylenes | 0.07 | 0.22 |
| 1,2,4,5-Tetramethylbenzene | 0.73 | 8.51 |
| 1,2,3,4-Tetramethylbenzene | 1.00 | 11.80 |
| 1,2,3,4-Tetramethylbenzene | 0.14 | 1.95 |
| Ethyltrimethylbenzene | — | 0.11 |
| Pentamethylbenzene | — | 0.42 |

Table III shows that the catalyst possesses high activity and high selectivity for isomerizing and disproportionating polymethylbenzenes. Orthoxylene is isomerized with an approach to chemical equilibrium of over 95 percent, and disproportionated to benzene, toluene, trimethylbenzenes and tetramethylbenzenes to an extent of about 70 percent of the theoretical amount of disproportionation. The trimethylbenzenes formed are in the ratio of 7.5:68.2:24 for the 1,2,3 to 1, 2.74 to 1,3,5 isomers. This ratio is virtually the same as that predicted from thermodynamics. In isomerizing the orthoxylene, virtually no ethylbenzene is formed. In disproportionating the orthoxylene, the trimethylbenzenes are selctively formed with very little ethyltoluene produced. The total amount of the three ethyltoluene isomers in the C₉ aromatic fraction is less than 0.35 percent. Hence, the trimethylbenzenes may be separated with substantially no contamination from ethyltoluene isomers.

Pseudocumene (1,2,4-trimethylbenzene) is also isomerized to the other trimethylbenzenes mesitylene and hemimellitene and is disproportionated to form toluene, xylenes and tetramethylbenzenes. Again, the aromatic fraction one carbon heavier, namely the C₁₀ fraction, than the feed material is substantially free of ethylaromatics such as ethylxylenes. Consequently, durene may be readily recovered from the C₁₀ aromatic fraction by crystallization. The ratio of the tetramethylbenzenes formed on disproportionation are 8.8:53.0:38.2 for the 1,2,3,4 to 1,2,3,5 to 1,2,4,5 isomers. Althought close to the thermodynamic ratio, the amount of prehnitene (1,2,3,4-tetramethylbenzene) is slightly less and the amount of durene (1,2,4,5-tetramethylbenzene) is slightly greater than what would be expected from chemical equilibrium considerations.

We claim:

1. A composite catalyst comprising hydrogen mordenite having a silica to alumina mole ratio of between about 12:1 and 80:1, an eta or gamma binder and a sulfided Group VIII metal impregnated on said mordenite, said alumina comprising from 10 to 50 weight percent of said composite catalyst.

2. A catalyst according to claim 1 wherein said Group VIII metal comprises from 0.2 to 10.0 weight percent of said composite catalyst.

3. A catalyst according to claim 1 wherein said Group VIII metal is nickel or cobalt and comprises from 3.0 to 8.0 weight percent of said composite catalyst.

4. A catalyst according to claim 1 wherein said Group VIII metal is selected from the group consisting of platinum, palladium, rhodium and ruthenium and comprises from 0.2 to 2.0 weight percent of said composite catalyst.

5. A catalyst according to claim 1 wherein said alumina comprises from 15 to 30 weight percent of said composite catalyst.

6. A catalyst according to claim 1 wherein a sulfided Group VIB metal is associated with said composite catalyst and comprises 3.0 to 15.0 weight percent thereof.

7. A catalyst according to claim 1 wherein said silica to alumina mole ratio is from about 25:1 to 50:1.

* * * * *

UNITED STATES PATENT AND TRADEMARK OFFICE
CERTIFICATE OF CORRECTION

PATENT NO. : 3,912,659
DATED : October 14, 1975
INVENTOR(S) : JOHN T. BRANDENBURG, ROBERT M. SUGGITT & THOMAS M. LIDEN It is certified that error appears in the above-identified patent and that said Letters Patent are hereby corrected as shown below:

Col. 8, line 24    "60/1.400" should read --60/1. 400--

Col. 11, line 22   "esentially" should read --essentially--

Col. 12, line 9    "1,2,3,4-Tetramethylbenzene" should read --1,2,3,5-Tetramethylbenzene--

Col. 12, line 21   "1,2.74" should read --1,2,4--

Signed and Sealed this

Twenty-ninth Day of March 1977

[SEAL]

Attest:

RUTH C. MASON
Attesting Officer

C. MARSHALL DANN
Commissioner of Patents and Trademarks